United States Patent
Hashimoto et al.

(10) Patent No.: US 6,774,506 B2
(45) Date of Patent: Aug. 10, 2004

(54) ELECTRIC POWER DEMAND ADJUSTING SYSTEM

(75) Inventors: Hiroyuki Hashimoto, Tokyo (JP); Yoshio Izui, Tokyo (JP); Masashi Kitayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 336 days.

(21) Appl. No.: 10/118,374

(22) Filed: Apr. 9, 2002

(65) Prior Publication Data

US 2003/0052542 A1 Mar. 20, 2003

(30) Foreign Application Priority Data

Sep. 17, 2001 (JP) ........................................ 2001-281466

(51) Int. Cl.[7] .................................................. H02J 3/18
(52) U.S. Cl. .......................................... 307/38; 700/291
(58) Field of Search .................... 307/38, 39; 700/291; 324/103 R

(56) References Cited

U.S. PATENT DOCUMENTS 5,414,640 A * 5/1995 Seem .......................... 700/291
6,278,909 B1 * 8/2001 Thibeault et al. ............ 700/286
2002/0190577 A1 * 12/2002 Jenni ............................ 307/31
2003/0158631 A1 * 8/2003 Masuda et al. .............. 700/286

FOREIGN PATENT DOCUMENTS

| JP | 9-84146 | 3/1997 |
| JP | 2000-333369 | 11/2000 |

* cited by examiner

*Primary Examiner*—Gregory J. Toatley, Jr.
(74) *Attorney, Agent, or Firm*—Leydig, Voit & Mayer, Ltd.

(57) ABSTRACT

An electric power demand adjusting system restrains fluctuation in an incentive for adjusting the demand for electric power or fluctuation in an electric power demand adjustment amount caused by an incentive. The system includes a central apparatus, lower units, and computing machine systems of consumers, which are connected through a communication network. The computing machine system of the central apparatus has a device for predicting a demand, a device for determining the electric power demand adjustment amounts to be sent to the lower units on the basis of the predicted demand and information that includes historical data regarding the electric power demand adjustments of the lower units, and a device for transmitting the determined electric power demand adjustment amounts to the lower units. The arrangement restrains the fluctuation in incentives required for adjusting the demand for electric power.

18 Claims, 6 Drawing Sheets

ELECTRIC POWER DEMAND ADJUSTING SYSTEM

This application is based on Application No. 2001-281466, filed in Japan on Sep. 17, 2001, the contents of which are hereby incorporated by reference.

BACKGROUND OF THE INVENTION

1. Field of the Invention

The present invention relates to an electric power demand adjusting system and, more particularly, to the restraint of the fluctuation in an incentive necessary for adjusting the electric power demand or the restraint of the fluctuation in an electric power demand adjustment amount attributable to incentive.

2. Description of the Related Art

A conventional load-leveling type electric power demand and supply adjusting system disclosed in, for example, Japanese Unexamined Patent Publication No. 2000-333369, stores nighttime electric power, which is in low demand, in a different form of energy and puts the stored energy back into electric power during a daytime time zone when the demand reaches its peak. The system also applies electric power accommodated from another electric power company when there is a shortage of electric power supply.

Such a load-leveling type electric power demand and supply adjusting system makes up for the difference between a planned demand value and an actual result value by accommodation from another electric power system demand and supply controller. The system, therefore, has been disadvantageous in that the system is not effective if there is a shortage in absolute supply amount. There has been also a problem in that the system does not have any means to restrain by itself the fluctuation involved in demand and supply adjustment, so that considerable uncertainty remains in company's revenue management, a project for leveling load, etc. especially in the recent circumstances where demand adjustment is priced in supporting the liberalization of electric power. Hence, there has been a demand for an electric power demand and supply adjusting system suited for the liberalization of electric power.

SUMMARY OF THE INVENTION

Accordingly, the present invention has been made with a view toward solving the above problems, and it is an object thereof to provide an electric power demand adjusting system that remains effective even if a shortage in an absolute supply amount occurs and that is capable of successfully dealing with the liberalization of electric power.

To this end, according to one aspect of the present invention, there is provided an electric power demand adjusting system for restraining fluctuation in an incentive required for adjusting electric power demand in an electric power system for supplying electric power energy to a plurality of consumers through the intermediary of a plurality of lower units of an electric power supplier that have demand adjusting functions from a central apparatus of the electric power supplier that has an electric power demand adjusting function, the lower units transmitting an adjustment amount for demand adjustment and an amount associated with load conditions, including incentive, so as to make a decision by negotiating with the consumers, the central apparatus being accessed by the plurality of lower units, and the central apparatus, the plurality of lower units, and the computing machine systems of the consumers being linked through the intermediary of a communication network, wherein a computing machine system of the central apparatus includes a device for projecting a demand, a device for determining electric power demand adjustment amounts to the individual lower units on the basis of information that includes a projected situation and history data related to electric power demand adjustment of the plurality of lower units, and a device for transmitting the determined electric power demand adjustment amounts to the plurality of lower units.

With this arrangement, the following advantage will be provided. When an attempt is made to perform necessary adjustment of the demand for electric power according to the consumption of electric power by a consumer that varies depending upon natural conditions, such as weather, the location of a consumer, season, a day of the week, time, etc., the incentives necessary for performing such demand adjustment vary from one consumer to another. Furthermore, from a macroscopic viewpoint, the incentives vary also in the lower units involved in a plurality of consumers. The system in accordance with the present invention is advantageous in that the demand adjustment amounts for the individual lower units are determined, taking into account the history data or the like regarding the demand adjustment of a plurality of lower units to accomplish demand adjustment so as to control the influences of the fluctuation in incentives. This enables a central apparatus at, for example, an electric power supplier to reduce the influences of fluctuation in cost involved in incentives.

According to another aspect of the present invention, there is provided an electric power demand adjusting system for restraining fluctuation in an electric power demand adjustment amount due to an incentive in an electric power system for supplying electric power energy to a plurality of consumers through the intermediary of a plurality of lower units of an electric power supplier that have demand adjusting functions from a central apparatus of the electric power supplier that has an electric power demand adjusting function, the lower units transmitting an adjustment amount for demand adjustment and an amount associated with load conditions, including incentive, so as to make a decision by negotiating with the consumers, the central apparatus being accessed by the plurality of lower units, and the central apparatus, the plurality of lower units, and the computing machine systems of the consumers being linked through the intermediary of a communication network, wherein a computing machine system of the central apparatus includes a device for projecting a demand, a device for determining incentives to the individual lower units on the basis of information that includes a projected situation and history data related to electric power demand adjustment of the plurality of lower units, and a device for transmitting the determined incentives to the plurality of lower units.

With this arrangement, the following advantage will be provided. When an attempt is made to perform necessary adjustment of the demand for electric power according to the consumption of electric power by a consumer that varies depending upon natural conditions, such as weather, the location of a consumer, season, a day of the week, time, etc. or an alternative factor, such as a private power generation by a consumer, the demand adjustment amounts for incentives vary from one consumer to another. Furthermore, from a macroscopic viewpoint, the demand adjustment amounts vary also in the lower units involved in a plurality of consumers. The system in accordance with the present invention is advantageous in that the incentives to be allotted to the individual lower units are determined, taking into account the history data or the like regarding the demand adjustment of a plurality of lower units to accomplish demand adjustment so as to control the influences of the fluctuation in demand adjustment amounts. This enables a central apparatus at, for example, an electric power supplier, to reduce the influences of fluctuation in demand adjustment amounts obtained by a certain incentive.

According to yet another aspect of the present invention, there is provided an electric power demand adjusting system for restraining fluctuation in an incentive required for adjusting electric power demand or fluctuation in an electric power demand adjustment amount attributable to an incentive in an electric power system for supplying electric power energy to a plurality of consumers through the intermediary of a plurality of lower units of an electric power supplier that have demand adjusting functions from a central apparatus of the electric power supplier that has an electric power demand adjusting function, the lower units transmitting an adjustment amount for demand adjustment and an amount associated with load conditions, including incentive, so as to make a decision by negotiating with the consumers, the central apparatus being accessed by the plurality of lower units, and the central apparatus, the plurality of lower units, and the computing machine systems of the consumers being linked through the intermediary of a communication network, wherein a computing machine system of the central apparatus includes a device for projecting a demand situation, a device for determining electric power adjustment amounts or incentives to be transmitted to the individual lower units on the basis of information that includes a projected situation and history data related to electric power demand adjustment of the plurality of lower units, and a device for transmitting the determined electric power adjustment amounts or incentives to the plurality of lower units.

With this arrangement, the following advantage will be provided. The demand adjustment amounts observed from the lower units involved in a plurality of consumers are classified into two types according to the characteristics of individual consumers, one type being characterized by considerable fluctuation attributable to incentives, while the other type being characterized by considerable fluctuation attributable to changes in demand. The system in accordance with the present invention is advantageous in that one of the above two types, whichever is appropriate, is selected to accomplish demand adjustment so as to control the influences of the fluctuation. This enables a central apparatus at, for example, an electric power supplier to reduce the influences of fluctuation associated with demand adjustment.

According to a further aspect of the present invention, there is provided an electric power demand adjusting system for restraining fluctuation in an incentive required for adjusting electric power demand in an electric power system for supplying electric power energy to a plurality of consumers from a demand adjusting apparatus of an electric power supplier that has an electric power demand adjusting function, the demand adjusting apparatus transmitting an adjustment amount for demand adjustment and an amount associated with load conditions, including incentive, so as to make a decision by negotiating with the consumers, the demand adjusting apparatus being accessed by the plurality of consumers, and the demand adjusting apparatus and the computing machine systems of the plurality of consumers being linked through the intermediary of a communication network, wherein a computing machine system of the demand adjusting apparatus includes a device for determining electric power demand adjustment amounts to be transmitted the individual consumers on the basis of information that includes history data related to electric power demand adjustment, and a device for transmitting the determined electric power demand adjustment amounts to the plurality of consumers.

With this arrangement, the following advantage will be provided. When an attempt is made to perform necessary adjustment of the demand for electric power according to the consumption of electric power by a consumer that varies depending upon natural conditions, such as weather, the location of a consumer, season, a day of the week, time, etc., then the incentives necessary for demand adjustment vary from one consumer to another. The system in accordance with the present invention is advantageous in that the demand adjustment amounts for the individual consumers are determined, taking into account the history data or the like regarding the demand adjustment of a plurality of consumers to accomplish demand adjustment so as to control the influences of the fluctuation in incentives. This enables an electric power supplier to reduce the influences of fluctuation in cost involved in incentives.

According to another aspect of the present invention, there is provided an electric power demand adjusting system for restraining fluctuation in an electric power adjustment amount attributable to an incentive in an electric power system for supplying electric power energy to a plurality of consumers from a demand adjusting apparatus of an electric power supplier that has an electric power demand adjusting function, the demand adjusting apparatus transmitting an adjustment amount for demand adjustment and an amount associated with load conditions, including incentive, so as to make a decision by negotiating with the consumers, the demand adjusting apparatus being accessed by the plurality of consumers, and the demand adjusting apparatus and the computing machine systems of the plurality of consumers being linked through the intermediary of a communication network, wherein a computing machine system of the demand adjusting apparatus includes a device for determining incentives to be transmitted to the individual consumers on the basis of information that includes history data related to electric power demand adjustment, and a device for transmitting the determined incentives to the plurality of consumers.

With this arrangement, the following advantage will be provided. When an attempt is made to perform necessary adjustment of the demand for electric power according to the consumption of electric power by a consumer that varies depending upon natural conditions, such as weather, the location of the consumer, season, a day of the week, time, etc. or an alternative factor, such as a private power generation by a consumer, the demand adjustment amounts for incentives vary from one consumer to another. The system in accordance with the present invention is advantageous in that the incentives to be allotted to the individual consumers are determined, taking into account the history data or the like regarding the demand adjustment of a plurality of consumers to accomplish demand adjustment so as to control the influences of the fluctuation in demand adjustment amounts. This enables an electric power supplier to reduce the influences of fluctuation in demand adjustment amounts obtained by a certain incentive.

According to another aspect of the present invention, there is provided an electric power demand adjusting system for restraining fluctuation in an incentive required for adjusting electric power demand or fluctuation in an electric power demand adjustment amount attributable to an incentive in an electric power system for supplying electric power energy to a plurality of consumers from a demand adjusting apparatus of an electric power supplier that has an electric power demand adjusting function, the demand adjusting apparatus transmitting an adjustment amount for demand adjustment and an amount associated with load conditions, including incentive, so as to make a decision by negotiating with the consumers, the demand adjusting apparatus being accessed by the plurality of consumers, and the demand adjusting apparatus and the computing machine systems of the plurality of consumers being linked through the intermediary of a communication network, wherein a computing machine system of the demand adjusting apparatus includes a device for determining electric power adjustment amounts or incentives to be transmitted to the individual consumers on the basis of information that includes history data related to electric power demand adjustment, and a device for transmitting the determined electric power adjustment amounts or incentives to the plurality of consumers.

With this arrangement, the demand adjustment amounts observed from the demand adjusting apparatus are classified into two types according to the characteristics of individual consumers, one type being characterized by considerable fluctuation attributable to incentives, while the other type being characterized by considerable fluctuation attributable to changes in demand. The system in accordance with the present invention is advantageous in that parameters suited for individual consumers are selected to accomplish demand adjustment so as to control the influences of the fluctuation, as a whole. This enables an electric power supplier to further reduce the influences of fluctuation associated with demand adjustment.

Preferably, allocated incentives or demand adjustment amounts to be transmitted to the foregoing lower units or consumers are determined at certain time intervals by computation using the values of such incentives or demand adjustment amounts obtained one previous time on the basis of the history data regarding electric power demand adjustment. To determine an incentive or demand adjustment amount to be allotted to a lower unit or a consumer, an initial value therefor will be required to carry out optimization computation. When the system is operated at certain time intervals, using the value obtained at a closest time as the initial value makes it possible to shorten the time required for the computation.

Preferably, allocated incentives or demand adjustment amounts to be transmitted to the foregoing lower units or consumers are determined at certain time intervals by searching for data indicating a situation similar to the current situation on the basis of history data regarding electric power demand adjustment, and by using the data values obtained by the search. An incentive or demand adjustment amount allotted to a lower unit or a consumer is considered to be correlated to an external parameter, e.g., total demand for electric power, temperature, and a day of the week. The system is actuated at given time intervals to accumulate history data, and the accumulated history data is searched for the data that indicates highest similarity to a current situation. By using the search result as the initial value, the time required for the computation can be shortened.

DESCRIPTION OF THE PREFERRED EMBODIMENTS

First Embodiment

The following will illustrate a case where a central apparatus is an upper unit functioning as a demand adjustment center server of an electric power company for adjusting the demand of electric power energy, while a lower unit functions as a demand adjustor server of the electric power company for implementing negotiations with consumers to adjust demand. In the following descriptions, an electric power company is used as an example of an electric power supplier. The electric power supplier, however, will include any person, company, or group engaged in business of supplying electric power, such as an electric power supplier who purchases electric power from an electric power company and supplies the purchased electric power to consumers.

Figure 1:
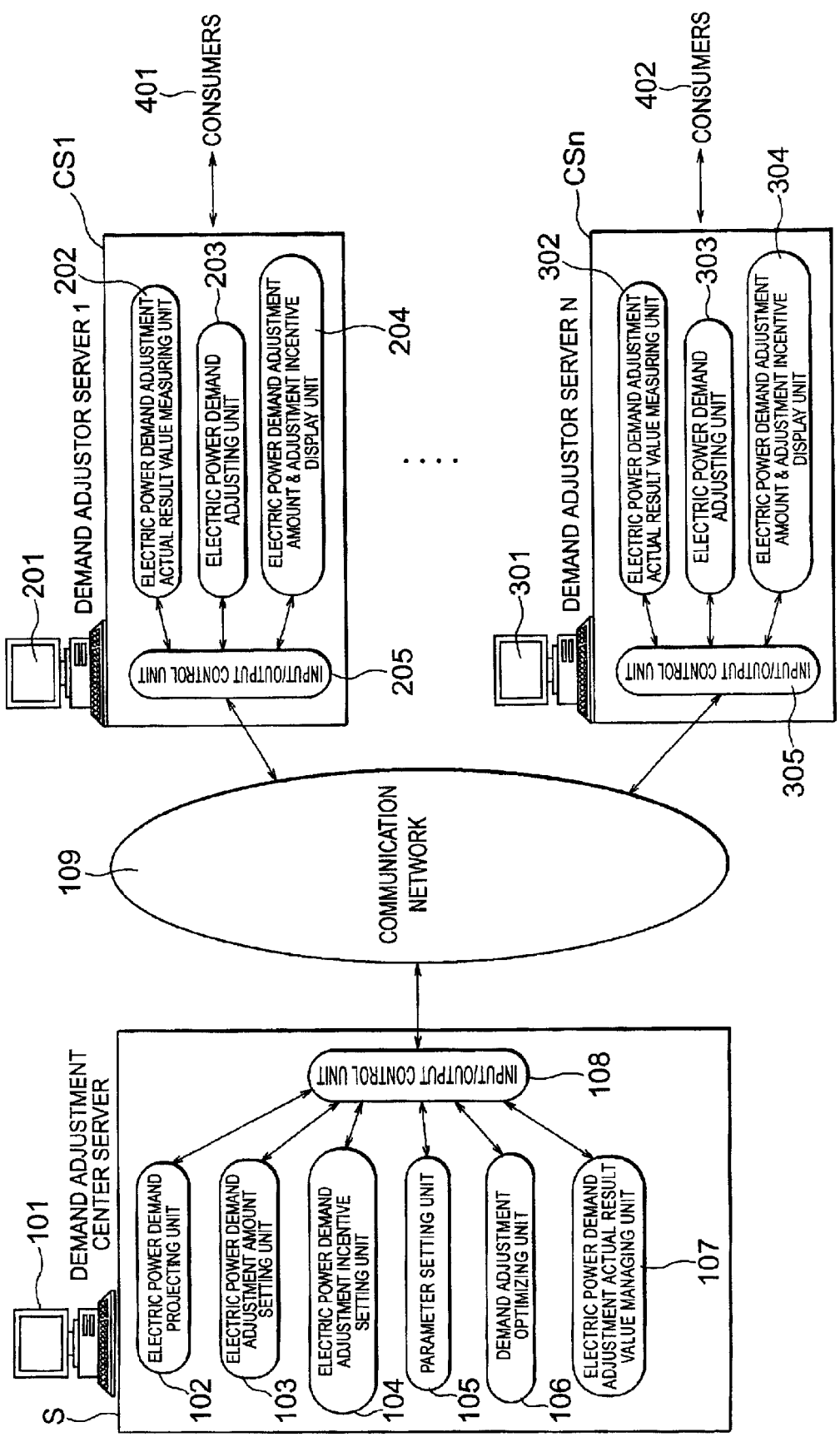
FIG. 1 shows a configuration of an electric power demand adjusting system according to an embodiment of the present invention.

FIG. 1 shows a configuration of an electric power demand adjusting system according to an embodiment of the present invention. Referring to FIG. 1, in the electric power demand adjusting system, a demand adjustment center server S is connected with a plurality of ("n" pieces in this case) demand adjustor servers (1 through n) CS1 through CSn through the intermediary of a communication network 109. The demand adjustment center server S and a plurality of demand adjustor servers (1 through n) CS1 through CSn are constructed of computing machine systems 101, 201, and 301, respectively. Reference numerals 102 through 108 denote internal functional units of the computing machine system 101. Similarly, reference numerals 202 through 205 denote the internal functional units of the computing machine system 201, and reference numerals 302 through 305 denote the internal functional units of the computing machine system 301. The demand adjustor servers (1 through n) CS1 through CSn are respectively connected to the computing machine systems (not shown) of a plurality of consumers 401 through the intermediary of a communication network (not shown).

The computing machine system 101 has an electric power demand projecting unit 102, an electric power demand adjustment amount setting unit 103, an electric power demand adjustment incentive setting unit 104, a parameter setting unit 105 for setting parameters, such as initial values, necessary for the computation of optimization, a demand adjustment optimizing unit 106, an electric power demand adjustment actual result value management unit 107, and an input/output control unit 108 connected to the communication network 109.

The computing machine systems 201 and 301 have electric power demand adjustment actual result value measuring units 202 and 302, respectively, electric power demand adjusting units 203 and 303, respectively, for negotiating with consumers 401 and 402 to adjust demand, electric power demand adjustment amount & adjustment incentive display units 204 and 304 for the consumers, and input/output control units 205 and 305, respectively, connected with the communication network 109.

Figure 2:
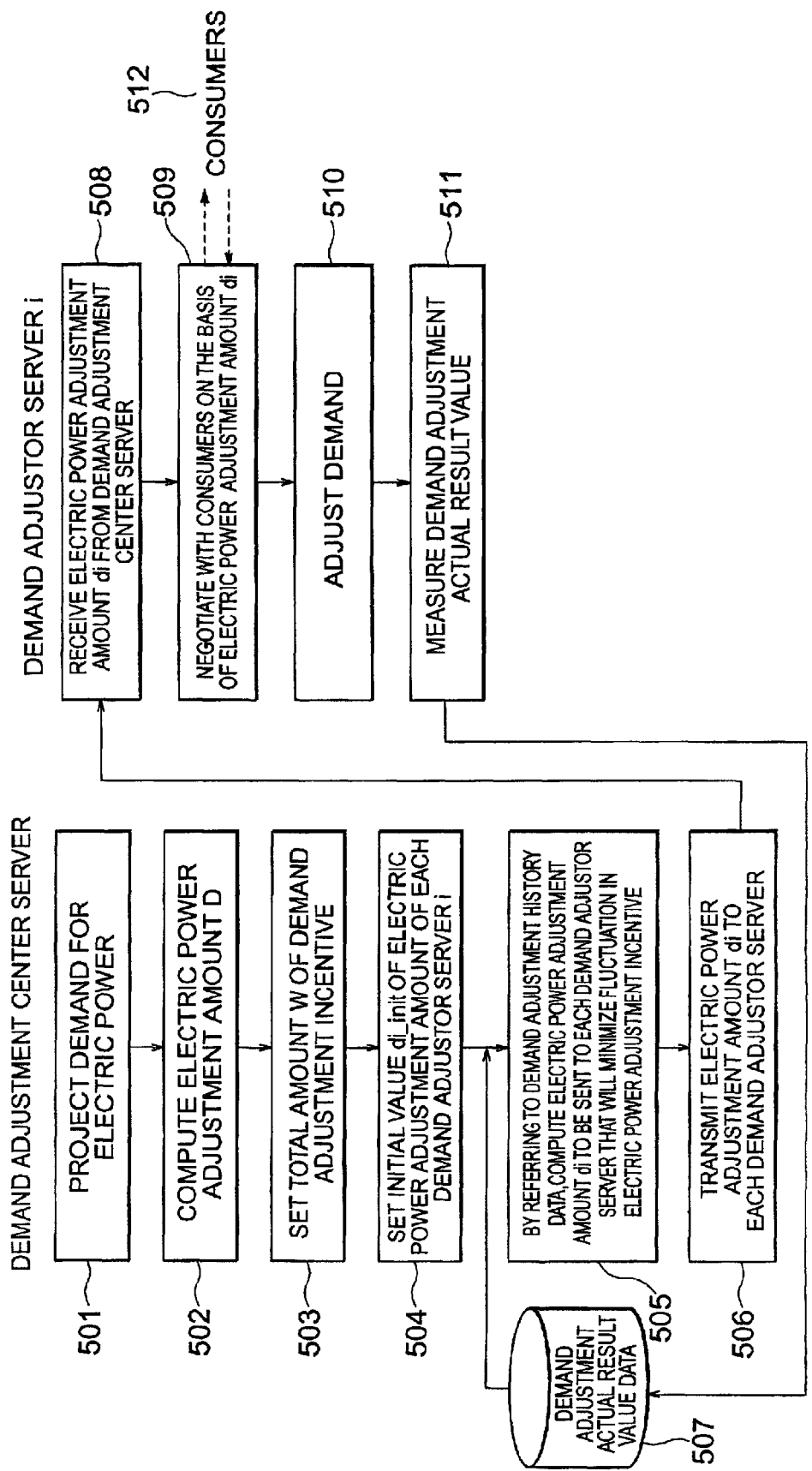
FIG. 2 is a flowchart showing an operation of an electric power demand adjusting system according to a first embodiment of the present invention.

An operation of a first embodiment will now be described with reference to the flowchart shown in FIG. 2. The steps from 501 through 506 in FIG. 2 are carried out by a demand adjustment center server S. The steps from 508 through 511 are carried out by a plurality of demand adjustor servers CS1 through CSn.

In the steps 501 through 504 carried out by the demand adjustment center server S, the operations are performed to make setting for determining, by computation, the electric power adjustment amounts to be allotted to the demand adjustor servers CS1 through CSn. The steps can be associated with the units of the demand adjustment center server S shown in FIG. 1. More specifically, step 501 for projecting the demand for electric power is implemented by the electric power demand projecting unit 102, step 502 for calculating an electric power adjustment amount D is implemented by the electric power demand adjustment amount setting unit 103, step 503 for setting a total amount W of a demand adjustment incentive is implemented by the electric power demand adjustment incentive setting unit 104, and step 504 for setting initial values di_init of the electric power adjustment amounts of demand adjustor servers (i) CS1 through CSn is implemented by the parameter setting unit 105.

The total amount D of electric power adjustment amount can be set by, for example, taking the amount of electric power generated by a generator having higher power generating cost as a target amount from a projected value of the demand for electric power when leveled load is a goal to be attained. Furthermore, when a projected value of the demand for electric power exceeds a maximum amount of generated electric power, the difference of the projected value from the maximum amount can be set as a load reduction amount D. An incentive may be, for example, a cooperative bonus or an electric power charge discount. The demand adjustment center server S decides beforehand the total amount W that can be used as an incentive. Then, in step 505, electric power adjustment amounts di to be allotted to the demand adjustor servers (i) CS1 through CSn that minimize the fluctuation in incentives are determined by, for example, solving the problem for minimization shown below. Among the demand adjustment actual result value data shown in a database 507, expected values ri of the incentives of the demand adjustor servers and covariances σ of the incentives among the demand adjustor servers are used.

$$\sum_i^n \sum_j^n \sigma^r_{ij} d_i d_j \to \min$$

$$s.t. \sum_j^n r_j d_j = W$$

$$\sum_j^n d_j \geq D$$

$$d_j \geq 0 \ (j = 1, 2, \cdots, n)$$

In step 506, the electric power adjustment amounts di calculated in step 505 are transmitted to the demand adjustor servers (i) CS1 through CSn through the intermediary of the communication network 109. The demand adjustor servers that have received in step 508 the electric power adjustment amounts di through the input/output control units 205 and 305, respectively, carry out negotiations with a plurality of local consumers 401 and 402 through the electric power demand adjustment amount & adjustment incentive display units 204 and 304, respectively, so as to implement the allotted electric power adjustment amounts di in step 509. In step 510, demand adjustment is performed by the electric power demand adjusting units 203 and 303 on the basis of the negotiation results. In step 511, the actual result values are measured by the electric power demand adjustment actual result value measuring units 202 and 302. The demand adjustment, although it depends on the contents of contracts by negotiations, can be performed by, for example, adjusting owned loads by consumers themselves or by cutting off the loads by the demand adjustor servers or the like when there is a shortage in an absolute supply amount. The actual results of the demand adjustor servers are sent to the demand adjustment center server S through the intermediary of the communication network 109, and stored and managed as data by the electric power demand adjustment actual result value management unit 107, which corresponds to the database 507.

By carrying out the series of operations illustrated by the flowchart shown in FIG. 2 in the configuration shown in FIG. 1, it is possible to minimize the fluctuation in incentives necessary for the adjustment of the demand for electric power so as to adjust the demand. This enables a demand adjustment center server, such as an electric power company, to obviate an unwanted increase in cost by controlling beforehand the fluctuation in revenue as much as possible, the fluctuation being caused by the adjustment of the demand for electric power.

Second Embodiment

In the first embodiment set forth above, the example has been described in which the adjustment amounts allotted to the demand adjustor servers are used as decision variables, and the operations are performed according to the flowchart shown in FIG. 2 so as to minimize the fluctuation in the expected values of the total incentive amounts necessary for the demand adjustment. In the second embodiment, the descriptions will be given of a case where the operations will be performed using, as the decision variables, incentives wi allotted to the demand adjustor servers (i) CS1 through CSn.

Figure 3:
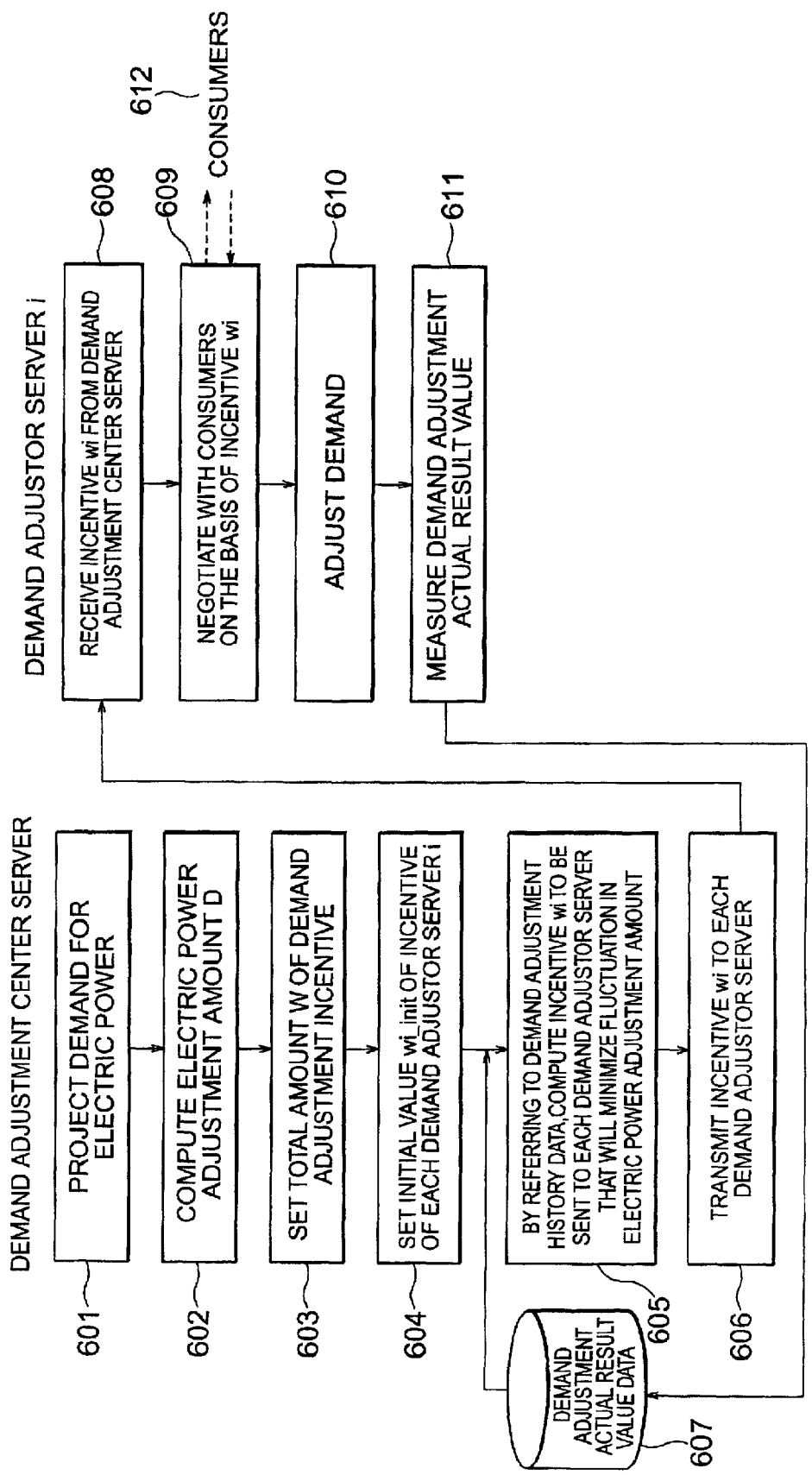
FIG. 3 is a flowchart showing an operation of an electric power demand adjusting system according to a second embodiment of the present invention.

The operations are performed by a system having the configuration shown in FIG. 1 according to the flowchart shown in FIG. 3. The same operation procedure used in the first embodiment shown in FIG. 2 will be used. In step 604 shown in FIG. 3, the incentive wi of each demand adjustor server is set, and in step 605, the value of wi that will minimize the fluctuation in the demand adjustment amount can be determined by, for example, solving the optimization problem shown below. In the following expression, qi denotes an expected value of a demand adjustment amount per unit incentive in each demand adjustor server, and $\sigma^q$ denotes a covariance related to q.

$$\sum_i^n \sum_j^n \sigma^q_{ij} w_i w_j \to \min$$

$$s.t. \sum_j^n w_j = W$$

$$\sum_j^n w_j q_j \geq D$$

$$w_j \geq 0 \ (j = 1, 2, \cdots, n)$$

Thus, it is possible to achieve demand adjustment by minimizing the fluctuation in the demand adjustment amount obtained by a certain incentive. This enables a demand adjustment center server S, such as an electric power company, to more securely expect a demand adjustment amount by a certain incentive so as to plan more accurate demand adjustment.

Third Embodiment

As described in the second embodiment in which the operations were performed according to the flowchart of FIG. 3 by the configuration shown in FIG. 1, the allotment of incentives to the demand adjustor servers (i) CS1 through CSn to minimize the fluctuation in the demand adjustment amount obtained by a certain incentive will be considered. In this case, if, for instance, it is discussed to purchase an amount of electric power corresponding to the demand adjustment amount based on a certain incentive from another electric power company or IPP, then it is possible to make a decision by comparing the incentive and the cost of purchase from another electric power company.

Thus, suspending its costly power generator that can be replaced by the purchase of electric power leads to reduced cost. In this case, a decision is made only on the purchase, so that no actual demand adjustment is performed or partial demand adjustment is performed according to a certain amount of purchased electric power.

Fourth Embodiment

In the first embodiment set forth above, the example has been described in which the adjustment amounts allotted to the demand adjustor servers are used as decision Variables, and the operations are performed according to the flowchart shown in FIG. 2 so as to minimize the fluctuation in the expected values of the total incentive amounts necessary for the demand adjustment. In the fourth embodiment, the descriptions will be given of a case where desirable parameters are selected in accordance with the local demand characteristics of the demand adjustor servers (i) CS1 through CSn in order to restrain the fluctuation involved in demand adjustment. The fourth embodiment shares the same configuration shown in FIG. 1, and the operation thereof follows the flowchart shown in FIG. 4.

Figure 4:
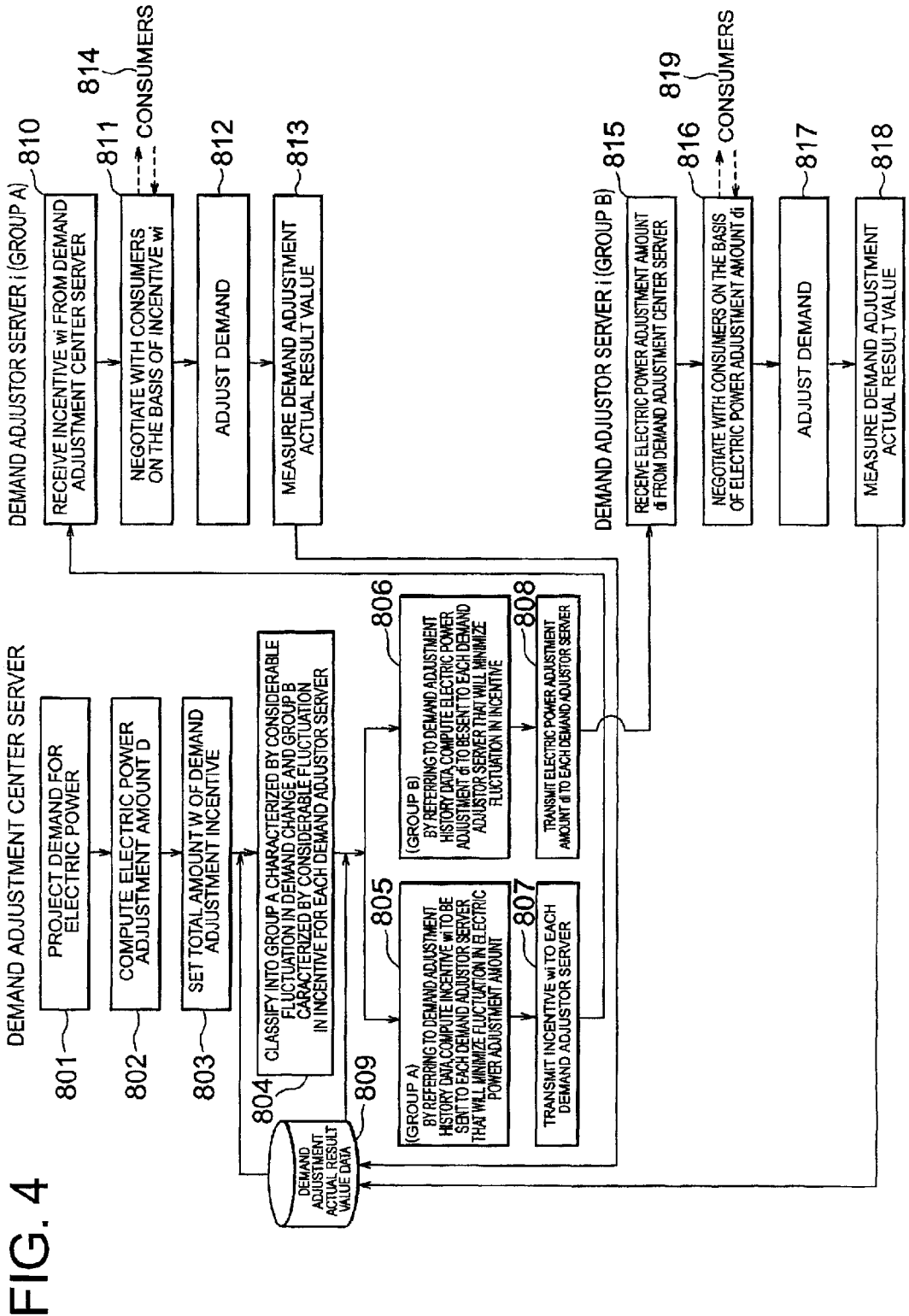
FIG. 4 is a flowchart showing an operation of an electric power demand adjusting system according to a fourth embodiment of the present invention.

Referring to FIG. 4, the operations are basically formed of a combination of the operations of the foregoing first and second embodiments. Steps 805 and 807 and steps 810 through 813 correspond to steps 605 and 606 and steps 608 through 611 shown in FIG. 3. Similarly, steps 806 and 808 and steps 815 through 818 correspond to steps 505 and 506 and steps 508 through 511 shown in FIG. 2.

In step 804, the characteristics of all consumers associated with demand adjustor servers (i) CS1 through CSn are classified into group A that shows considerable fluctuation in demand adjustment amounts and group B that shows considerable fluctuation in incentives. In step 805, the incentives to be allotted are determined by computation so as to reduce the fluctuation in demand adjustment amounts for group A. In step 806, the demand adjustment amounts to be allotted are determined by computation so as to reduce the fluctuation in incentives for group B. Thus, the fluctuation factors involved in demand adjustment can be controlled.

Fifth Embodiment

The foregoing embodiments illustrate the cases where the central apparatus is the upper apparatus, namely, the demand adjustment center server at an electric power company that adjusts the demand for electric power energy, while the lower units are the demand adjustor servers at an electric power company that perform the negotiations for demand adjustment with consumers. The present invention, however, can be also applied to a case where the central apparatus is a demand adjustor server at an electric power company, while the lower units are the servers at consumers, as shown in FIG. 5.

Figure 5:
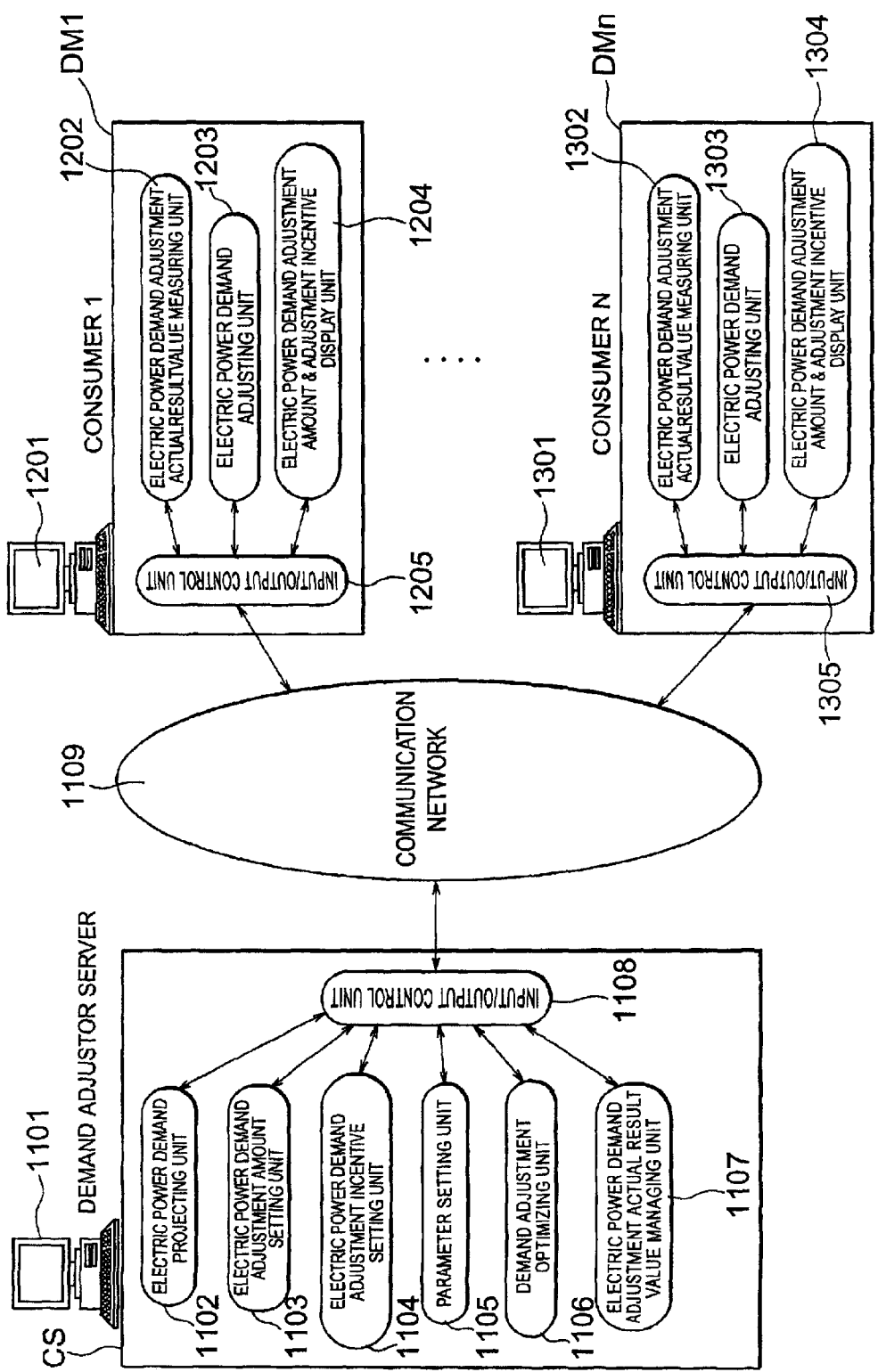
FIG. 5 shows a configuration of an electric power demand adjusting system according to another embodiment of the present invention.

FIG. 5 shows the configuration of an electric power demand and supply adjustment system according to another embodiment of the present invention. Like the one shown in FIG. 1, the electric power demand adjusting system according to this embodiment has a demand adjustor server CS connected to a plurality of ("n" pieces in this embodiment) consumer servers (1 through n) DM1 through DMn via a communication network 1109. The demand adjustor server CS and the plurality of consumer servers (1 through n) DM1 through DMn are constituted by computing machine systems 1101, 1201, and 1301, respectively. Reference numerals 1102 through 1108 denote internal functional units of the computing machine system 1101. Similarly, reference numerals 1202 through 1205 denote the internal functional units of the computing machine system 1201, and reference numerals 1302 through 1305 denote the internal functional units of the computing machine system 1301.

The computing machine system 1101 has an electric power demand projecting unit 1102, an electric power demand adjustment amount setting unit 1103, an electric power demand adjustment incentive setting unit 1104, a parameter setting unit 1105 for setting parameters, such as initial values, necessary for the computation of optimization, a demand adjustment optimizing unit 1106, an electric power demand adjustment actual result value management unit 1107, and an input/output control unit 1108 connected to the communication network 1109.

The computing machine systems 1201 and 1301 have electric power demand adjustment actual result value measuring units 1202 and 1302, respectively, electric power demand adjusting units 1203 and 1303, respectively, electric power demand adjustment amount & adjustment incentive display units 1204 and 1304, respectively, and input/output control units 1205 and 1305, respectively, connected with the communication network 1109.

The above units correspond to those units shown in FIG. 1.

Like advantages can be obtained by performing the operations described in the foregoing embodiments by the demand adjustor server CS and the consumer servers (1 through n) DM1 through DMn shown in FIG. 5. More specifically, the demand adjustor server CS will be able to use the data regarding the history of the negotiations with the consumer servers (1 through n) DM1 through DMn to allot demand adjustment amounts to the consumers so as to minimize the fluctuation in a total incentive amount. Furthermore, the demand adjustor server CS will be able to use the data regarding the history of the negotiations with the consumer servers (1 through n) DM1 through DMn to provide the consumers with incentives so as to minimize the fluctuation in demand adjustment amounts.

Thus, the fluctuation can be controlled even at lower levels in the demand adjustor server CS and the consumer servers (1 through n) DM1 through DMn, permitting more accurate demand adjustment to be accomplished.

Sixth Embodiment

Another case will be described where the central apparatus is a demand adjustment center server at an electric power company, which acts as an upper apparatus for adjusting the demand for electric power energy, while a lower unit is a demand adjustor server at the electric power company for negotiating with consumers to perform adjustment of their demands, as shown in FIG. 1. It is obvious that the combination of the demand adjustor server and the consumer servers, shown in FIG. 5, may be used for the same purpose. In this embodiment, the demand adjustment amounts to be transmitted to demand adjustor servers are computed at certain time intervals.

Figure 6:
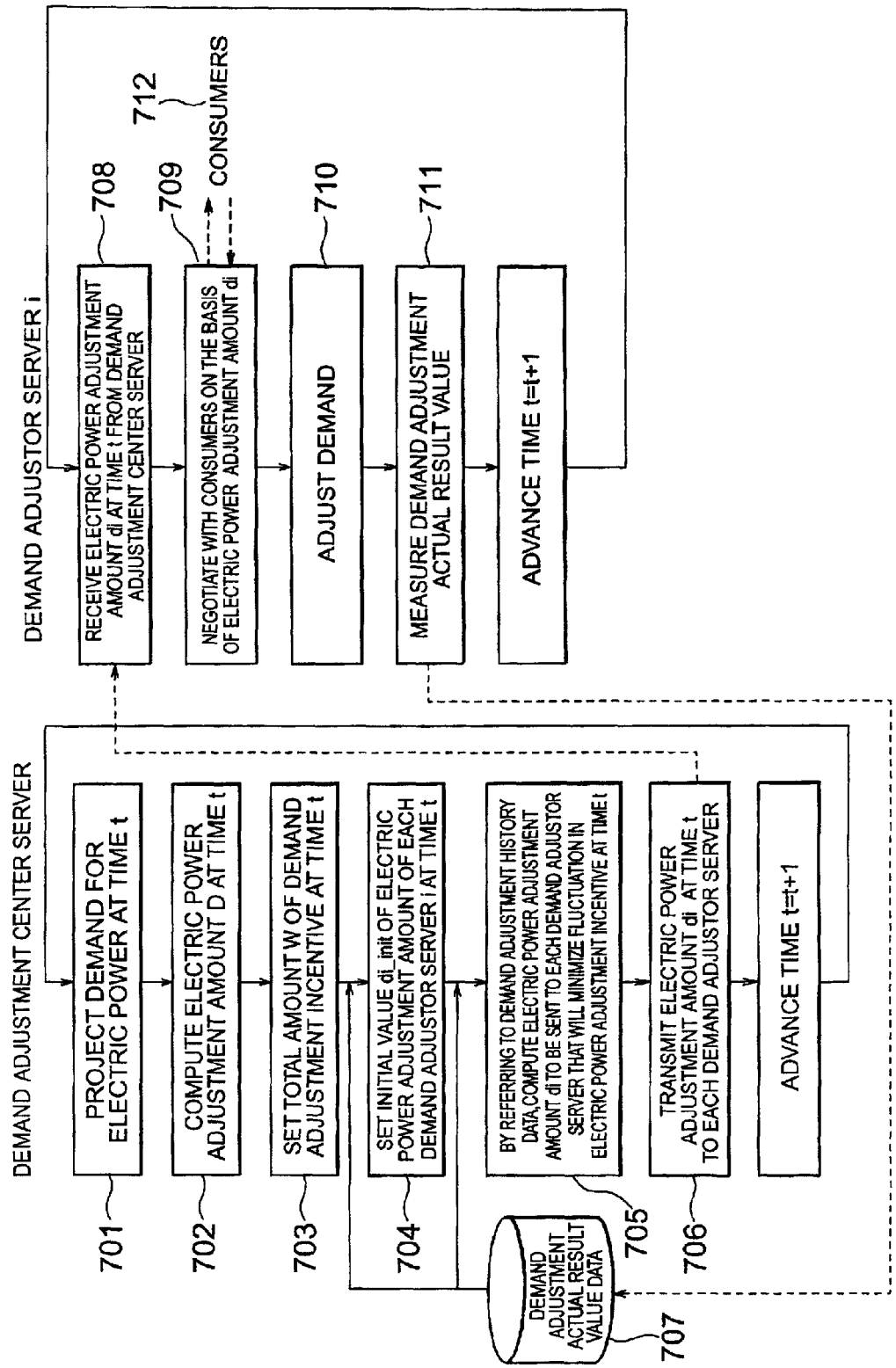
FIG. 6 is a flowchart showing an operation of an electric power demand adjusting system according to a sixth embodiment of the present invention.

In a configuration similar to the one shown in FIG. 1, an operation is performed according to the flowchart shown in FIG. 6. Steps 701 through 706 in FIG. 6 correspond to steps 501 through 506 in FIG. 2, and steps 708 through 711 in FIG. 6 correspond to steps 508 through 511 in FIG. 2.

In the operation, the actual result value data regarding demand adjustment is stored at each time t in succession. An appropriate initial value should be given to perform the computation in step 705 by using the data. In the computation performed at time t, taking out data di(t−1), which is the previous data obtained one time before, from a database 707 to set this data as the initial value for the computation makes it possible to set a value close to a solution to be converged to, allowing the required computation time to be shortened. To determine an incentive or demand adjustment amount to be allotted to the demand adjustor server at the electric power company or a consumer, an initial value therefor will be required to carry out optimization computation. When the system is operated at certain time intervals, performing the above operation permits the time required for the computation to be shortened by using the value obtained at a closest time as the initial value.

Measuring and storing actual demand record data and closely correlated external parameters together leads to shortened computation time. More specifically, a situation closest to the current time t is searched for through the actual result data stored in the database 707 by using a stored external parameter as a clue, and the search result is set as the initial value for computation at time t. Thus, an optimum value can be selected from the actual result data as the value close to the solution to be converged to, so that efficient computation can be expected, leading to reduced computation time. An incentive or demand adjustment amount allotted to a demand adjustor server of an electric power company or a consumer is considered to be correlated to an external parameter, e.g., total demand for electric power, temperature, and a day of the week. Performing the above operation makes it possible to actuate the system at given time intervals to accumulate history data, and to search the accumulated history data for the data that indicates highest similarity to a current situation. By using the search result as the initial value, the time required for the computation can be shortened.

What is claimed is:

1. An electric power demand adjusting system for an electric power system supplying electric power to a plurality of consumers through a plurality of lower units of an electric power supplier, each lower unit having an electric power demand adjusting function, from a central apparatus of the electric power supplier, which has an electric power demand adjusting function, the lower units transmitting an adjustment amount for demand adjustment and an amount associated with load conditions, including an incentive, to make a decision by negotiating with the consumers, the central apparatus being accessed by the plurality of lower units through a computing machine system of the central apparatus, the plurality of lower units and the consumers being linked through a communication network, wherein the computing machine system of the central apparatus comprises:

means for predicting a demand condition;

means for determining one of (i) electric power adjustment amounts and (ii) incentives to be transmitted to respective lower units based on information that includes a predicted situation and historical data related to electric power demand adjustment of the plurality of lower units; and means for transmitting the one of electric power adjustment amounts and incentives determined to the plurality of lower units, whereby one of fluctuation in an incentive for electric power demand adjustment and fluctuation in electric power demand adjustment amount caused by the incentive is restrained.

2. The electric power demand adjusting system according to claim 1, wherein said determining means determines the electric power demand adjustment amounts to be transmitted to the individual lower units to restrain the fluctuation in the incentive for the electric power demand adjustment.

3. The electric power demand adjusting system according to claim 1, wherein said determining means determines incentives to be transmitted to the individual lower units to restrain the fluctuation in the electric power demand adjustment amount caused by the incentive.

4. An electric power demand adjusting system for an electric power system supplying electric power energy to a plurality of consumers from an electric power demand adjusting apparatus of an electric power supplier, which has an electric power demand adjusting function, the electric power demand adjusting apparatus transmitting an adjustment amount for demand adjustment and an amount associated with load conditions, including an incentive, to make a decision by negotiating with the consumers, the electric power demand adjusting apparatus being accessed by the plurality of consumers through a computing machine system of the electric power demand adjusting apparatus, the consumers being linked through a communication network, wherein the computing machine system of the electric power demand adjusting apparatus comprises:

means for determining one of (i) electric power demand adjustment amounts and (ii) incentives to be transmitted to the individual consumers based on information that includes historical data related to electric power demand adjustment; and means for transmitting the one of the electric power demand adjustment amounts and incentives determined to the plurality of consumers, whereby one of fluctuation in an incentive for electric power demand adjustment and fluctuation in the electric power demand adjustment amount caused by the incentive is restrained.

5. The electric power demand adjusting system according to claim 4, wherein said determining means determines the electric power demand adjustment amounts to be transmitted to the individual consumers to restrain the fluctuation in the incentive for the electric power demand adjustment.

6. The electric power demand adjusting system according to claim 4, wherein said determining means determines incentives to be transmitted to the individual consumers to restrain the fluctuation in the electric power demand adjustment amount caused by the incentive.

7. The electric power demand adjusting system according to claim 1, wherein one of allocated incentives and demand adjustment amounts to be transmitted to one of the lower units and consumers is determined at certain time intervals by computation using one of corresponding amounts obtained previously, based on the historical data regarding electric power demand adjustment.

8. The electric power demand adjusting system according to claim 2, wherein allocated demand adjustment amounts to be transmitted to the lower units are determined at certain time intervals by computation using corresponding amounts obtained previously based on the historical data regarding electric power demand adjustment.

9. The electric power demand adjusting system according to claim 3, wherein allocated incentives to be transmitted to the lower units are determined at certain time intervals by computation using corresponding amounts obtained previously based on the historical data regarding electric power demand adjustment.

10. The electric power demand adjusting system according to claim 4, wherein one of allocated incentives and demand adjustment amounts to be transmitted to one of the lower units and consumers is determined at certain time intervals-by computation using one of corresponding amounts obtained previously, based on the historical data regarding electric power demand adjustment.

11. The electric power demand adjusting system according to claim 5, wherein allocated demand adjustment amounts to be transmitted to the consumers are determined at certain time intervals by computation using corresponding amounts obtained previously, based on the historical data regarding electric power demand adjustment.

12. The electric power demand adjusting system according to claim 6, wherein allocated incentives to be transmitted to the consumers are determined at certain time intervals by computation using corresponding amounts obtained previously, based on the historical data regarding electric power demand adjustment.

13. The electric power demand adjusting system according to claim 1, wherein one of allocated incentives and demand adjustment amounts to be transmitted to one of the lower units and consumers is determined at certain time intervals by searching for data indicating a situation similar to a current situation, based on the historical data regarding electric power demand adjustment, and by computation using the data obtained by the searching.

14. The electric power demand adjusting system according to claim 2, wherein allocated demand adjustment amounts to be transmitted to the lower units are determined at certain time intervals by searching for data indicating a situation similar to a current situation, based on the historical data regarding electric power demand adjustment, and by computation using the data obtained by the searching.

15. The electric power demand adjusting system according to claim 3, wherein allocated incentives to be transmitted to the lower units are determined at certain time intervals by searching for data indicating a situation similar to a current situation, based on the historical data regarding electric power demand adjustment, and by computation using the data obtained by the searching.

16. The electric power demand adjusting system according to claim 4, wherein one of allocated incentives and demand adjustment amounts to be transmitted to one of the lower units and consumers are determined at certain time intervals-by searching for data indicating a situation similar to a current situation, based on the historical data regarding electric power demand adjustment, and by computation using the data obtained by the searching.

17. The electric power demand adjusting system according to claim 5, wherein allocated demand adjustment amounts to be transmitted to the consumers are determined at certain time intervals by searching for data indicating a situation similar to a current situation, based on the historical data regarding electric power demand adjustment, and by computation using the data obtained by the searching.

18. The electric power demand adjusting system according to claim 6, wherein allocated incentives to be transmitted to the consumers are determined at certain time intervals by searching for data indicating a situation similar to a current situation, based on the historical data regarding electric power demand adjustment, and by computation using the data obtained by the searching.

* * * * *